No. 611,963. Patented Oct. 4, 1898.
J. W. HOFFMAN.
BACK PEDALING BRAKE.
(Application filed Oct. 11, 1897.)
(No Model.) 2 Sheets—Sheet 1.
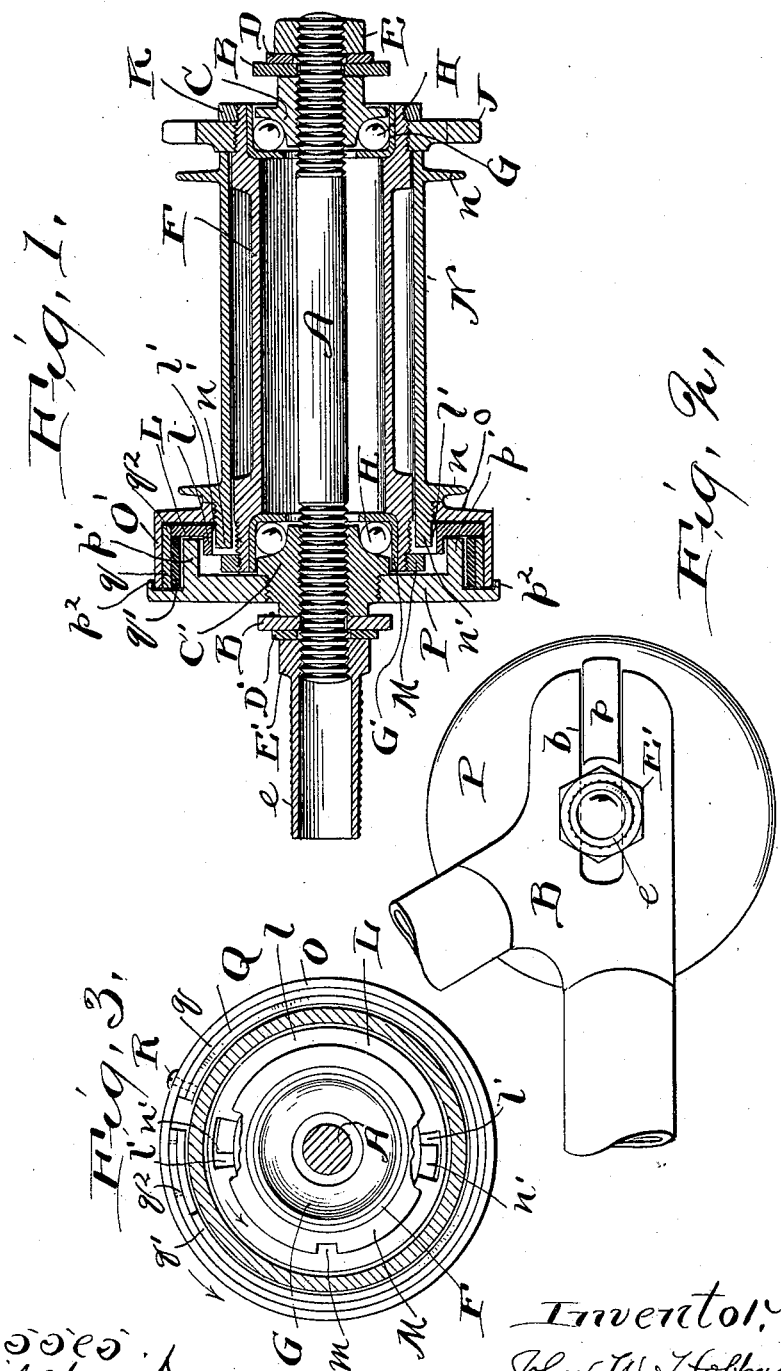
Witnesses
E. B. Gilchrist
H. M. Hutchison.
Inventor:
John W. Hoffman,
By his Attorney,
Thurston & Bates No. 611,963. Patented Oct. 4, 1898.
J. W. HOFFMAN.
BACK PEDALING BRAKE.
(Application filed Oct. 11, 1897.)
(No Model.) 2 Sheets—Sheet 2.
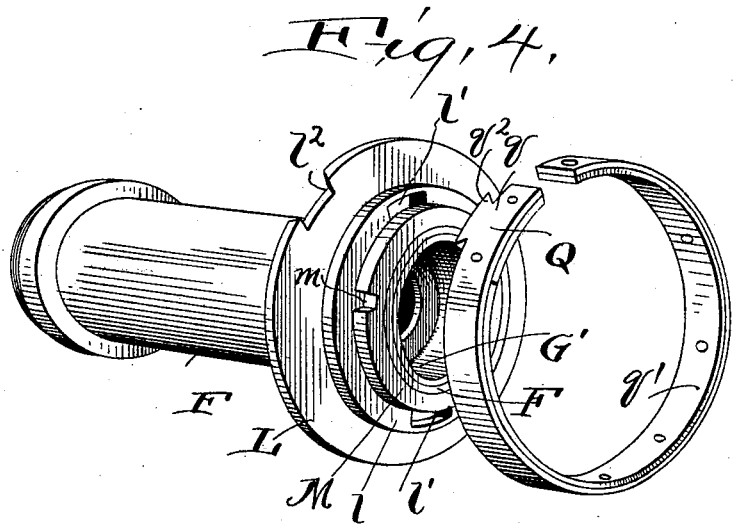
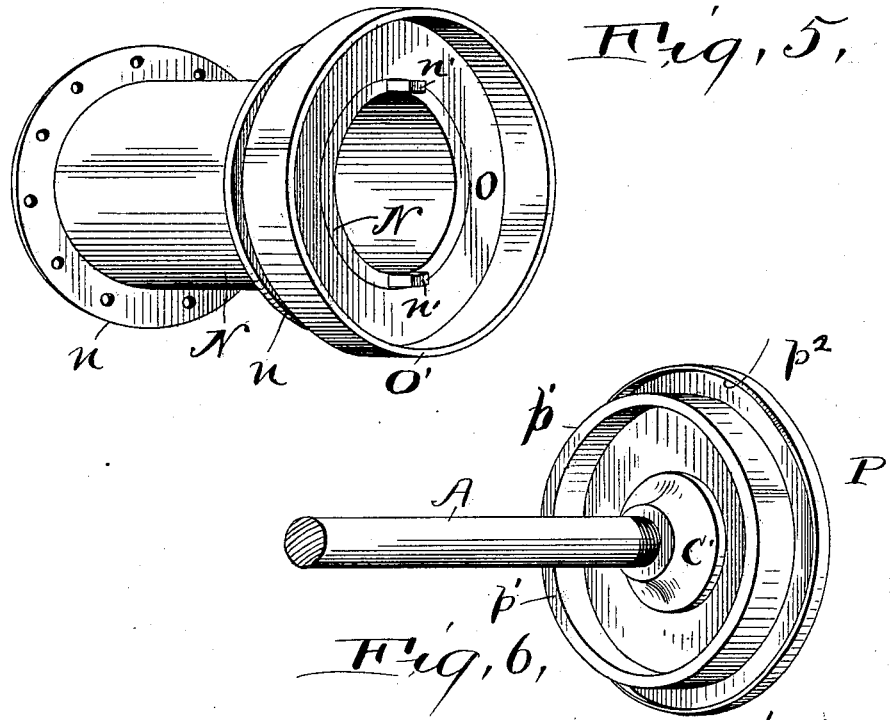
Witnesses
E. B. Gilchrist
N. M. Hutchison
Inventor
John W. Hoffman,
By his Attorneys,
Thurston & Bates.

UNITED STATES PATENT OFFICE.

JOHN W. HOFFMAN, OF CLEVELAND, OHIO.

BACK-PEDALING BRAKE.

SPECIFICATION forming part of Letters Patent No. 611,963, dated October 4, 1898.

Application filed October 11, 1897. Serial No. 654,825. (No model.)

*To all whom it may concern:*

Be it known that I, JOHN W. HOFFMAN, a citizen of the United States, residing at Cleveland, in the county of Cuyahoga and State of Ohio, have invented certain new and useful Improvements in Bicycle-Brakes; and I do hereby declare the following to be a full, clear, and exact description of the invention, such as will enable others skilled in the art to which it appertains to make and use the same.

My invention relates to a brake adapted to be applied to the rear or driving wheel of a bicycle or similar vehicle and be operated by a backward movement of the driving power, by back-pedaling.

The object of the invention is to supply such a brake which shall be compact and neat in appearance, inexpensive in construction, durable and not liable to get out of order, and very efficient in its braking action.

To this end it consists, broadly, of a sprocket or other driving wheel, a hub, a connection between the wheel and hub such that the wheel may move some distance independent of the hub, but cannot make a complete forward rotation without driving the hub, combined with a stationary braking-surface and a brake-band adapted to be caused to coact therewith by relative movement between the driving-wheel and hub.

More specifically the invention consists of a pair of hubs, one outside the other, a stationary braking-surface, a brake-band adapted to act on the stationary surface and having one end connected to one of the hubs and the other end to the other, combined with such connections between the driving power and the hubs that during the forward movement the two hubs will move together and the band be out of contact with the stationary braking member, but on back-pedaling one hub will be shifted on the other and the band be tightened around such stationary member.

The invention may also be said to consist in the combination of parts hereinafter described, and definitely enumerated in the claims.

The drawings clearly disclose my invention.

Figure 1 is a vertical central section through the hub of a bicycle-wheel having my improved brake. Fig. 2 is an end view of the same. Fig. 3 is likewise an end view, but with stationary member removed, except its flange, which is shown in section. Fig. 4 is a perspective view of the inner hub, the brake-band being detached. Fig. 5 is a perspective view of the outer hub, and Fig. 6 a perspective view of the stationary braking member and the axle. The hub shown in Fig. 4 fits inside of that shown in Fig. 5, and the axle, as shown in Fig. 6, inside of the two.

The same reference-letters designate the same parts in the several figures.

Referring to the parts by letters, A represents the axle of the driven wheel of a bicycle or similar vehicle. This axle is rigidly secured to the rear fork B of the frame of the machine by means of the cone-nuts C C' and the washers D D' and nuts E E' or in other desirable manner. As shown in the drawings, the nut E' has a tubular extension $e$, whereby it constitutes the ordinary bicycle-step.

F represents the inner hub. This hub carries at each end a ball-cup G G', between which cup and the corresponding cone rolls a set of balls H. Secured on this hub near one end is the sprocket-wheel J. I prefer to secure this wheel by screwing it onto the hub and locking it thereto by a jam-nut K. Secured to the hub near its other end is the plate L. This plate is also preferably secured to the hub by being screwed onto the same and by being locked thereto by a similar jam-nut, (designated in this case M,) the nut being in the usual circular form and having a notch $m$ for the insertion of a spanner-wrench. Either the sprocket-wheel J or the plate L might be made integral with the hub F or secured in other manner than that described, if desired. On this plate L, contiguous to the hub, is the annular boss $l$. One or more holes $l'$ are formed through this boss and the plate L. There are preferably two of these holes on diametrically opposite sides of the hub, the holes being substantially segment-shaped.

N represents the outer hub. The spokes of the wheel are secured to this hub in any desirable manner, flanges $n$, as shown in the drawings, being ordinarily provided for that purpose. This outer hub closely surrounds the hub F, but is not rigidly secured to it and may be turned upon it. Projecting from the end of this hub N into the holes $l'$ in the plate L are lugs $n'$. These lugs are preferably integral with the hub N and there are as many of them as there are holes $l'$. They are smaller than the holes $l'$ in about the proportion shown, whereby the hub N may be shifted to some extent about the hub F. A cup consisting of the annular plate O and the flange O' is attached to the hub N at the braking end thereof, preferably by being screwed onto it, as shown in the drawings, though it might be made integral or be otherwise secured to it.

P represents the stationary braking member. This member is preferably screwed on the cone C', as shown, and locked against rotation by a lug $p$, projecting into the slot $b$, formed at the rear end of the fork B, or in other desirable manner. The annular flange $p'$ projects inward from the plate P, and the periphery of this flange forms the stationary braking-surface. The plate P extends beyond this flange, as shown in the drawings, and has a small inward flange $p^2$ projecting over the flange O' and forming a dust-cap for the same.

The brake-band, which is shown detached in Fig. 4 and in place in Fig. 1 and designated Q, consists of an outer split steel ring $q$ and an inner lining $q'$, which is made, preferably, of leather or similar material. This lining may be attached to the steel ring in any desired manner, and the two together constitute the braking-band. I have shown rivets connecting the lining and ring, and this I deem the preferable form. A dovetailed tongue $q^2$ is formed on one side of the ring $q$, near one end, and takes into a similarly-shaped notch $l^2$ in the periphery of the plate L. By this means one end of the brake-band is secured to the inner hub F. The other end of the brake-band is attached by a screw R or in other desired manner to the flange O', and is thus secured to the outer hub N. The points of attachment of the two ends of this band are such with reference to the holes $l'$ and the lugs $n'$ that when the rear walls of the holes are in contact with the rear side of the lugs, as they will be when the wheel is being driven forward, the braking-band stands in its enlarged position in close contact with the flange O'. When, however, the inner hub F is shifted backward relative to the outer hub, (as takes place when the rider back-pedals and the forward wall of the holes $l'$ comes into contact with the forward side of the lugs $n'$,) that end of the brake-band attached to the plate L is brought backward and nearer to the other end of the band, and the band is thus contracted around the stationary flange $p'$, thereby causing a braking action and retarding or stopping the wheel.

The operation of my improved brake is such that during the forward movement the vehicle operates as if there were no brake, for the sprocket-wheel transmits its motion to the plate L, (which, as has been seen, is rigidly connected to the sprocket-wheel,) and the rear wall of the holes $l'$ bearing against the lugs $n'$ transmits the motion to the outer hub N and from thence to the wheel, and the brake-band is thus kept in close contact with the flange O' and out of engagement with the stationary flange $p'$. Upon back-pedaling, however, the sprocket-wheel shifts the disk L until the forward wall of the holes $l'$ impinges against the forward side of the lugs $n'$, and this, as already stated, contracts the braking-band around the stationary flange $p'$, which forms a braking-contact, impeding the speed of the wheel so long as the operator back-pedals. As soon as the operator resumes forward pedaling the braking action ceases and the wheel again revolves independently thereof.

I claim—

1. In a bicycle-brake, in combination, a non-rotatable axle, a hub F rotatably mounted thereon, a driving-wheel secured to said hub, and a disk-like plate L secured to one end thereof having the holes $l$, a hub, N, loosely mounted upon the hub F, having on its end the lugs $n'$ which enter the holes $l$, a flanged plate O secured to the end of the hub N and having a flange O', a non-rotatable cylindrical braking-surface, and a brake-band secured at one end to the flange O', and at the other end to the plate L, substantially as specified.

2. In a bicycle-brake, in combination, a non-rotatable axle, a hub F, rotatably mounted thereon, a driving-wheel secured to the other end thereof, which plate has the holes $l$, and the dovetail notch $l'$ in its edge, the hub N mounted upon hub F having lugs $n'$ which enter the holes $l$, a plate O having a flange O', a non-rotatable plate P having the cylindrical braking-flange $p'$, and a brake-band which surrounds said braking-surface and has at one end a dovetail tongue which engages in the notch $l^2$, and is secured at its other end to the inner surface of the flange O', substantially as specified.

In testimony whereof I affix my signature in presence of two witnesses.

JOHN W. HOFFMAN.

Witnesses:
ALBERT H. BATES,
E. B. GILCHRIST.